Patented Apr. 26, 1938

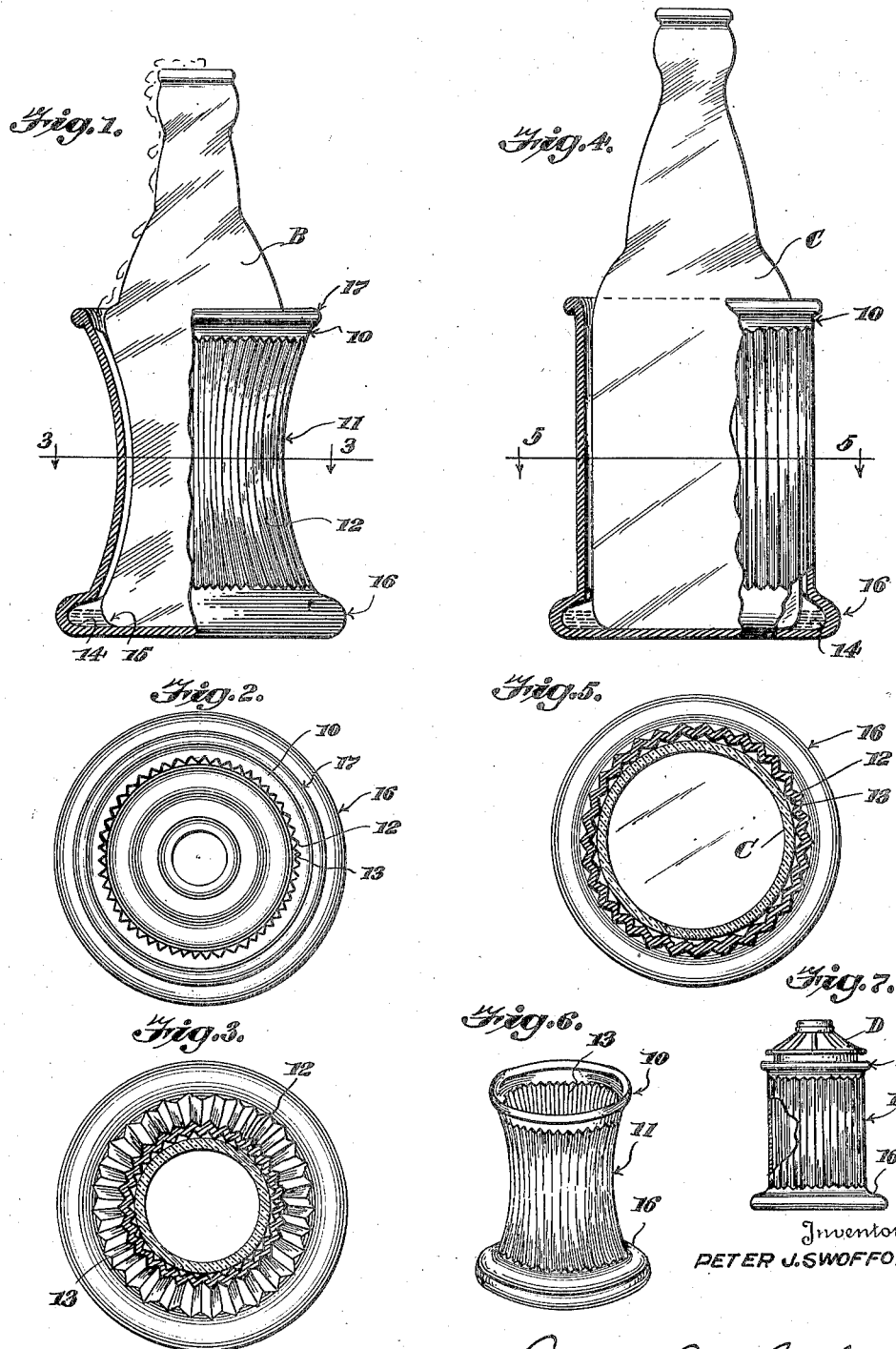

2,115,654

UNITED STATES PATENT OFFICE 2,115,654

BOTTLE AND CAN CONTAINER

Peter J. Swofford, Mineral Wells, Tex.

Application February 4, 1937, Serial No. 124,111

2 Claims. (Cl. 215—12)

This invention relates to bottle and can containers, and has for one of its objects the production of a simple and efficient container in the nature of a cup formed of rubber or other suitable material, in which a bottle or can may be placed in order to keep the bottle or can cold and prevent moisture from touching the hand of the user while pouring the contents from the bottle or can.

A further object of this invention is the production of a simple and efficient bottle and can container within which a bottle or can may be placed, the container being adapted to be formed of rubber or other elastic material and be so constructed as to permit moisture to pass down into a reservoir at the bottom of the container.

Other objects and advantages of this invention will appear throughout the following specification and claims.

In the drawing:

Figure 1 is a view showing the container partly in side elevation and partly in section, and illustrating one type of bottle placed therein;

Figure 2 is a top plan view of the container illustrated a bottle positioned therein;

Figure 3 is a transverse sectional view taken on line 3—3 of Figure 1;

Figure 4 is a view illustrating the container partly in side elevation and partly in section and showing a bottle positioned therein having straight sides;

Figure 5 is a transverse sectional view taken on line 5—5 of Figure 4;

Figure 6 is a perspective view of the container with the bottle or can removed; and Figure 7 is a view illustrating the container in which a can is placed, the container being shown partly in side elevation and partly in section.

By referring to the drawing, it will be seen that the present container preferably consists of a rubber or other elastic body formed in the nature of a cup 10, the side wall of which is normally bowed inwardly toward the center thereof, as indicated at 11, and shown in Figures 1 and 6, in order that the side wall of the cup may firmly grip the side wall of the receptacle or bottle B which is adapted to be placed within the cup, in a manner as shown in Figures 1 and 4. The side wall of the cup is corrugated longitudinally in tooth-like formation in cross-section, as indicated at 12, more particularly shown in Figure 3, to provide longitudinally extending tapering ribs upon the outer and inner faces of the side wall of the body, the outer ribs providing a roughened surface to facilitate the gripping of the cup by the hand of the user, and the inner ribs providing means for gripping the side wall of the bottle or receptacle placed within the cup, and also providing longitudinally extending channels 13 for allowing moisture to run or trickle down throughout the length of the container placed within the cup such as the receptacle B, into a large reservoir 14 formed at the bottom of the cup 10. The enlarged reservoir 14 comprises a substantially circular or annular channel arranged in a horizontal plane and extends entirely around the bottom 15 of the receptacle B, such as is shown in Figure 1. The reservoir 14 is formed within the enlarged bottom bead 16 which also provides a wide rest for supporting the cup 10, the bottom bead 16 being of greater diameter than the top bead 17 which is formed around the top of the container 10, as will be obvious by carefully considering Figure 1.

The longitudinal ribs 12 terminate short of the bottom and top beads 16 and 17, respectively, as shown in Figure 1, and the side wall of the cup, as stated above, is normally bowed inwardly intermediate the ends, or at the center, so as to adhere snugly to the side wall of the receptacle or bottle, certain receptacles having inwardly bowed side walls such as the receptacle or bottle B. This inwardly bowed wall of the container 10, such as is indicated at 11, will cause the wall of the container 10 to adhere snugly to the wall of the receptacle B and allow the wall 11 of the container to expand outwardly and conform snugly to the side wall of the receptacle or bottle, such as is indicated in Figure 4 wherein the bottle or receptacle C, or the can D, may be provided with straight walls. The formation of the wall of the container 10, in the manner described, will cause the container or cup to tightly and frictionally grip the receptacle placed therein and prevent the cup from dropping from the receptacle.

The fact, also, that the corrugated tapering ribs which as illustrated are preferably provided with sharp outer edges, will cause the container to firmly grip the receptacle placed therein and will thereby provide on the outer face a friction grip for the hand of the user, and consequently, the toothed formation of the corrugated body of the container or cup will also provide a multiplicity of channels to cause moisture collecting upon the bottle or receptacle placed within the container to trickle down into the reservoir 14. This reservoir 14 is of sufficient size to retain the normal amount of moisture which may collect therein and prevent the moisture from spilling out through the outer end of the container 10 when the bottle or receptacle supported thereby is tipped for pouring out the contents thereof.

The present device is adapted to support bottles of various standard types, as well as cans which are well-known on the market at this time, such as the Coca-Cola bottle, beer bottle, and beer can. Furthermore, the fact that the body of the container 10 is preferably formed of rubber or similar elastic material causes the device to possess a certain amount of flexibility whereby the container 10 may adjust itself to the various types of receptacles even though they may vary in some degree as to their diameter and particular shape.

As shown in Figures 1 and 6, the side wall of the container is normally bowed inwardly toward its center, and is capable of expanding outwardly to fit around either a concave or straight walled beverage receptacle, such as a bottle, can, or the like.

It should be borne in mind that the structure of the present device will provide means for not only supporting the bottle in the nature of a resilient cup which may be easily handled to keep the hands dry while handling the beverage receptacle, but will also act as a buffer to prevent the accidental breaking of the bottle or receptacle as well as provide a reservoir for catching the drippings or moisture which may collect upon the sides of the bottle or other receptacle. The device will constitute an efficient receptacle support to protect a table or other article of furniture from becoming marred from moisture from the receptacle, and will also tend to retard the sliding of the device over a table or other support.

While it is preferable to construct the cup or container 10 of rubber or other elastic material, it may be found desirable to construct the cup of other material, and this may be done without departing from the spirit of the invention, and the structure provided will also tend to retain the contents of the receptacle at a proper temperature for a considerable time, since the receptacle itself will not come into contact with the hand of the user. The fact, also, that the greater portion of the receptacle is surrounded by the cup or container will tend to keep the bottle cold for a considerable period of time thereby preserving the contents of the bottle or container at the proper desired temperature. The present device may also be applied for supporting glasses and other similar devices if desired, and it will produce not only a comfortable dispensing device for cans, bottles, glasses, and the like, but will also provide a sanitary handling device.

Having described the invention, what I claim as new is:—

1. As a new article of manufacture, a detachable container comprising a cup-like expansible and flexible body having longitudinally extending narrow drain channels formed upon the inner face, the body having a wall normally bowed inwardly toward the center of the body and adapted to flex outwardly to conform to the contour of a receptacle placed within the body, and the body having a laterally arranged moisture-receiving reservoir at its lower end extending beyond the side wall and communicating with the drain channels, for receiving moisture draining through the channels, the body being adapted to contact throughout its length with a receptacle placed therein whereby the liquid drained and stored within the reservoir will be held against splashing out through the top of the container.

2. As a new article of manufacture, a detachable container comprising a cup-like expansible and flexible body formed of rubber-like material having longitudinally extending narrow drain channels formed upon the inner face, the body having a wall normally bowed inwardly toward the center of the body and adapted to flex outwardly to conform to the contour of a receptacle placed within the body, the body having a laterally arranged moisture-receiving reservoir at its lower end extending beyond the side wall and communicating with the drain channels, for receiving moisture draining through the channels, the body being adapted to contact throughout its length with a receptacle placed therein whereby the liquid drained and stored within the reservoir will be held against splashing out through the top of the container, the moisture-receiving reservoir constituting an enlarged base having a flat under surface, the enlarged base projecting laterally from the side walls to provide a gripping and non-skid surface upon the bottom of the container.

PETER J. SWOFFORD.